(12) United States Patent
Boyd et al.

(10) Patent No.: US 12,018,754 B2
(45) Date of Patent: Jun. 25, 2024

(54) TACKY POLYURETHANE COMPOSITES

(71) Applicant: THE PATENT WELL LLC, Fort Worth, TX (US)

(72) Inventors: Matt Boyd, Fort Worth, TX (US); Kent Boomer, Aledo, TX (US); Emily Samuelson, Fort Worth, TX (US); Michael Dry, Fort Worth, TX (US); Jeff Busby, Millsap, TX (US)

(73) Assignee: The Patent Well LLC, Fort Worth, TX (US)

( * ) Notice: Subject to any disclaimer, the term of this patent is extended or adjusted under 35 U.S.C. 154(b) by 285 days.

(21) Appl. No.: 16/949,641

(22) Filed: Nov. 9, 2020

(65) Prior Publication Data
US 2021/0239215 A1 Aug. 5, 2021

Related U.S. Application Data

(63) Continuation-in-part of application No. 16/109,005, filed on Aug. 22, 2018, now abandoned, and a continuation-in-part of application No. 15/978,878, filed on May 14, 2018, now abandoned, and a continuation-in-part of application No. 14/802,462, filed on Jul. 17, 2015, now abandoned.

(51) Int. Cl.
*F16J 15/02* (2006.01)
*C09J 7/26* (2018.01)
*C09J 9/02* (2006.01)
*C09J 175/04* (2006.01)

(52) U.S. Cl.
CPC .............. *F16J 15/02* (2013.01); *C09J 7/26* (2018.01); *C09J 9/02* (2013.01); *C09J 175/04* (2013.01)

(58) Field of Classification Search
CPC  F16J 15/02; F16J 15/021; F16J 15/022; F16J 15/10; F16J 15/102; C09J 7/26; C09J 9/02; C09J 175/04
See application file for complete search history.

(56) References Cited

U.S. PATENT DOCUMENTS

| | | | | |
|---|---|---|---|---|
| 5,436,040 A | * | 7/1995 | Lafond | E06B 3/66342 428/192 |
| 5,656,358 A | * | 8/1997 | Lafond | E06B 3/66328 156/60 |
| 5,958,571 A | * | 9/1999 | Omura | F16J 15/122 277/944 |
| 9,890,302 B2 | * | 2/2018 | Tse | B05D 3/068 |
| 10,190,688 B2 | * | 1/2019 | Boyd | B32B 3/26 |
| 11,378,186 B1 | * | 7/2022 | Boyd | B29C 70/10 |
| 2004/0070156 A1 | * | 4/2004 | Smith | F16J 15/108 277/651 |

(Continued)

*Primary Examiner* — Eugene G Byrd
*Assistant Examiner* — L. Susmitha Koneru

(57) ABSTRACT

A number of tacky polyurethane or other gel comprising composites are provided. The composites have foam carriers, which may be open cell, semi-open cell, reticulated or closed-cell foam. The tacky gel which, in one embodiment, may be polyurethane, typically comprising a thin surface coating on the foam gel and the foam is partially or fully saturated with the same gel comprising the thin surface layer of the foam. The skeletons may be included in the composite to provide additional structure integrity, and a moisture proof layer may be added to the top and/or bottom surfaces of the foam/gel.

12 Claims, 6 Drawing Sheets

(56) References Cited

U.S. PATENT DOCUMENTS

| | | | |
|---|---|---|---|
| 2009/0322040 A1* | 12/2009 | Banba | C09J 7/22 |
| | | | 277/654 |
| 2010/0104852 A1* | 4/2010 | Fletcher | G03F 7/0002 |
| | | | 428/338 |
| 2011/0156353 A1* | 6/2011 | Kabutoya | F16J 15/064 |
| | | | 277/637 |
| 2014/0151968 A1* | 6/2014 | Hensley | F16J 15/022 |
| | | | 277/654 |
| 2014/0174654 A1 | 6/2014 | Kabutoya et al. | |
| 2014/0182778 A1* | 7/2014 | Kabutoya | C08G 65/336 |
| | | | 428/354 |
| 2014/0358104 A1* | 12/2014 | Tse | A61L 15/225 |
| | | | 604/372 |
| 2015/0119834 A1* | 4/2015 | Locke | A61F 13/00068 |
| | | | 156/247 |
| 2021/0253913 A1* | 8/2021 | Kitayama | C09J 7/38 |

* cited by examiner (UNDER COMPRESSION)

(UNDER COMPRESSION)

TACKY POLYURETHANE COMPOSITES

This application is a continuation in part of, and claims the benefit of and priority to, U.S. application Ser. No. 15/978,878, filed on May 14, 2018, which is a continuation of, and claims the benefit of and priority to, U.S. application Ser. No. 14/612,744, filed Feb. 3, 2015, which claims the benefit of provisional U.S. Application No. 61/935,101, filed Feb. 3, 2014, and incorporates the same by reference.

This application incorporates by reference, is a continuation in part of, and claims the benefit and priority to, U.S. application Ser. No. 16/109,005, filed Aug. 22, 2018, which claims the benefit of U.S. Application No. 62/548,786, filed Aug. 22, 2017 and is a continuation in part of U.S. application Ser. No. 15/472,859, filed Mar. 29, 2017 (now U.S. Pat. No. 10,507,478), which claims priority to U.S. Application No. 62/409,652, filed Oct. 18, 2016, and U.S. Application No. 62/315,361, filed Mar. 30, 2016.

This application incorporates by reference, is a continuation in part of, and claims benefit and priority to, U.S. application Ser. No. 14/802,462, filed Jul. 17, 2015, which claims the benefit of and priority to U.S. Application No. 62/078,451, filed Nov. 12, 2014, and U.S. Application No. 62/626,352, filed Jul. 18, 2014.

FIELD OF THE INVENTION

A gasket material for positioning between a workpiece and a base, more specifically, a gasket material having a foam core and a tacky, cured polyurethane gel.

BACKGROUND OF THE INVENTION

A gasket is a sealing member for use between two mating surfaces to help prevent tile movement of fluid or gas between the mating surfaces. They are often used in vehicles, such as aircraft, to prevent moisture from corroding the sealed off areas and the mating surfaces. They may be used in one embodiment for sealing between an aircraft antenna and the outer skin of the aircraft.

Gaskets may be provided for covering a portion of the "footprint" of the antenna against the outer surface of the aircraft. When the fasteners are tightened down, they compress the gasket typically with some deformation or gasket 'squeeze out", between the aircraft's outer skin and the inner surface or face of the antenna mounting plate. This is done in an effort to prevent moisture from penetrating the gasket barrier.

However, prior art gaskets have a number of shortcomings which applicants novel gasket material overcomes. These shortcomings include allowing moisture to penetrate the area between the workpiece and the base. Often, for example, a common site of corrosion is the junction between the antenna inner surface and the electrical connective elements of the antenna. Moisture has been found to "pool" in this area, accelerating corrosion. Further shortcomings of the prior art gaskets include their moisture content or moisture absorption ability, which moisture may encourage the formation of corrosion, when the gasket is under pressure between the mating surfaces and, especially, where such gasket includes a metallic element. Further shortcomings of the prior art gaskets include their "non-selective retentivity." This means that after the gasket has been installed and in use for a period of time, that upon an attempt to separate the antenna from the aircraft's skin, some portions of the gasket will non-selectively stick to portions of the aircraft's skin and other portions of the gasket will stick to the antenna. The result, often, is the destruction of the gasket.

Applicants disclose a gasket with a novel combination of properties and qualities that effectively prevent moisture from passing the sealed area while maintaining sufficient retentivity of a gel to gasket carrier. This allows the effective separation between the mating surfaces upon removal of the antenna.

Flexibility, resiliency. compressibility and pliability are other favorable properties which help affect a good seal between the mating surfaces.

All of these beneficial properties should have a useful life that is reasonable in view of operating conditions (repeated temperature and pressure cycling) and aircraft maintenance schedules. The gasket should be inert, that is non-reactive with the work pieces (typically aluminum) as well as non-reactive to water, including saltwater.

Not surprisingly, it has proven to be a challenge to develop a gasket with these properties that will survive repeated heat and pressure cycling (as the aircraft climbs and descends), structural flexing, and vibration while protecting the aircraft components and having a useful life.

While some of the prior art gaskets have provided some of the favorable properties set forth above, none have provided all of these properties in an aircraft gasket with a useful life.

Such typical useful life would be a minimum of greater than one year under proper torque specifications.

Applicants, however, provide for the above beneficial properties in a novel aircraft gasket and gasket tape and a novel method of manufacturing the aircraft gasket and gasket tape. Gasket tape is gasket material that is rolled into tape rather than precut to the pattern of the mating surfaces. Applicants further provide for a method of using the preformed gasket with a liquid settable gel to help insure a waterproof seal.

Applicants also disclose a novel method of preparing a gasket material. Applicants provide a gasket with the following beneficial properties, in a preformed gasket or a gasket tape: elasticity (with memory), low water absorption, low water content, leak free (especially of silicon oil), desiccation resistant, compressibility and surface tackiness (including selective retentivity).

The elasticity and pliability help make an effective seal between the two mating surface as compression against such elasticity helps seal over mating surface irregularities and structural flexing or vibration of the two surfaces. The maintenance of this elasticity property is important since the surfaces undergo thermal expansion and contraction during repeated altitude and temperature changes which causes relative movement (flexing) between the mating surfaces.

Low water absorption and low water content is also a beneficial quality as it is typically water or moisture that the gasket is meant to keep out. Nor should a gasket material itself be the source of oil, as such oil can mar the finish of the aircraft surface. Oil leaching has been a problem with prior art gaskets including those silicon-based gaskets.

An additional beneficial property of an effective gasket includes a resistance to drying out. Drying out of a gasket brings the problem of shrinkage and break-up, which may destroy the integrity of the gasket/mating surface.

Tackiness or stickiness has been found beneficial since there is also vibration and flexing of the mating surfaces.

Tackiness and resiliency provide a better seal should there be a slight separation between the mating surfaces.

SUMMARY OF THE INVENTION

A gasket comprising a first cellular foam carrier having an upper surface and a lower surface and a body between the upper and lower surface, the foam carrier between about 30 mil and 250 mil thick; a cured polyurethane gel layer on the upper and/or lower surfaces, the cured polyurethane gel layer at least partly penetrating the body of the foam carrier. Each of the gel layers may be between about 2 mil and 20 mil thick; and a moisture impervious layer, such as a PTFE layer, on top of one of either the upper or lower surfaces of the cured polyurethane layer. The gasket, in one embodiment, is between about 30 and 500 mil thick (uncompressed). The body of the foam carrier may have an upper portion and a lower portion, with a polyurethane gel layer between the upper and lower portions. There may be a skeletal member between the upper and lower portions.

DETAILED DESCRIPTION OF THE ILLUSTRATED EMBODIMENTS

Figure 1:
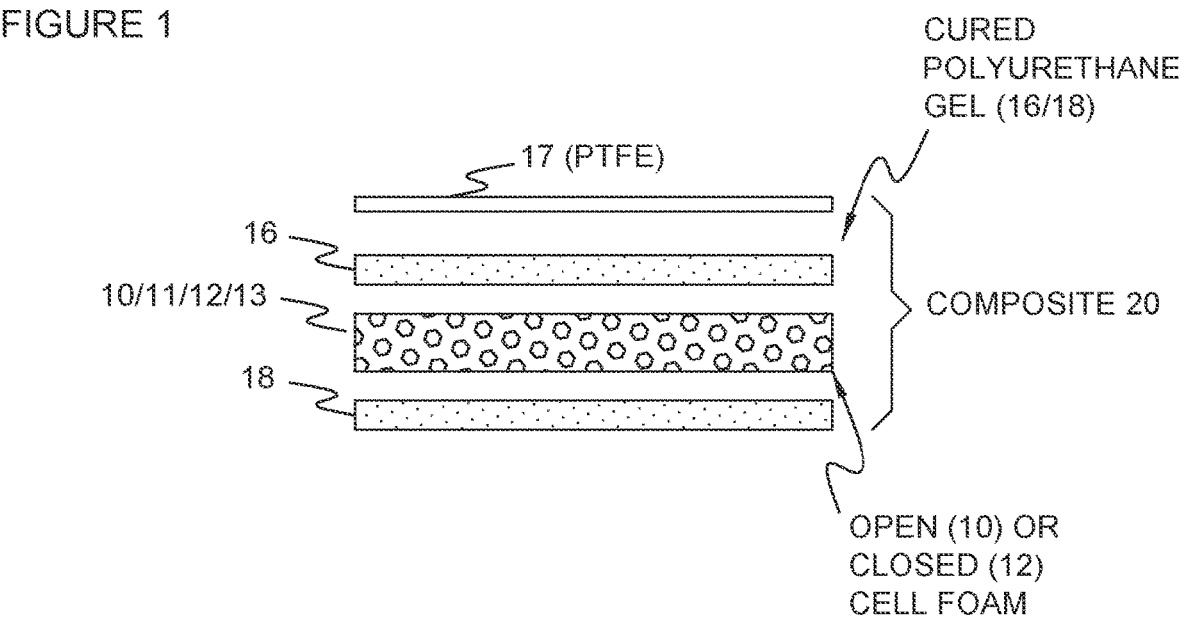
FIGS. 1, 2, and 3 illustrate exploded cross-sectional views of various embodiments of Applicant's novel gasket/tape FIGS. 1A, 2A, and 3A all illustrate cross-sectional views of Applicant's assembled gasket tape, showing at least some of the ingress of the polyurethane gel onto and at least partially into the foam body of the carrier.

FIG. 1 illustrates a composite structure 20 which may be used as a gasket, tape or sealant, which may be comprised of either an open 10, semi-open 11, closed 12 or reticulated 13 foam carrier, such as, in one embodiment, polypropylene or polyurethane foam. In one embodiment, a sticky or tacky cured polyurethane gel top layer 16, and a similar bottom layer 18 is provided in a manner that may either partially or completely saturate the foam and/or adhere to the surface of the closed cell foam. In one embodiment, a PTFE sheet 17, which is fluid and moisture proof, is adhered to the top and/or bottom foam layer, so it adheres to the gel, but presents a non-sticky, slideable moisture proof surface to the workpiece or base. This provides ease of positioning the workpiece when the gasket is in place.

Figure 1A:
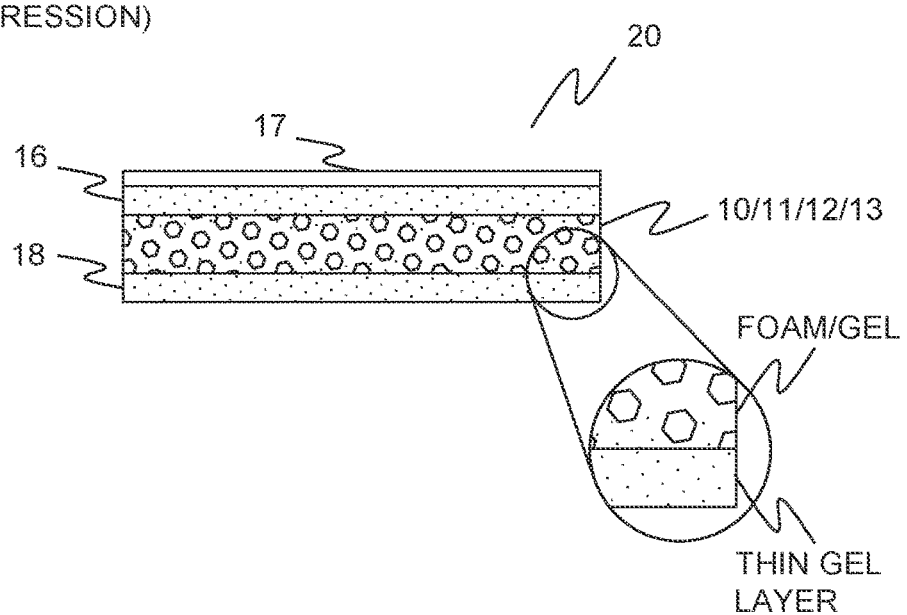

FIG. 1A and the Detail illustrate in a compressed state that the use of foam, such as allows at least some of the gel to soak through and into any open cells of the foam. Even with closed cell foam, there is typically some migration of polyurethane gel into the foam under compression between a workpiece and a base or another workpiece.

Figure 2:
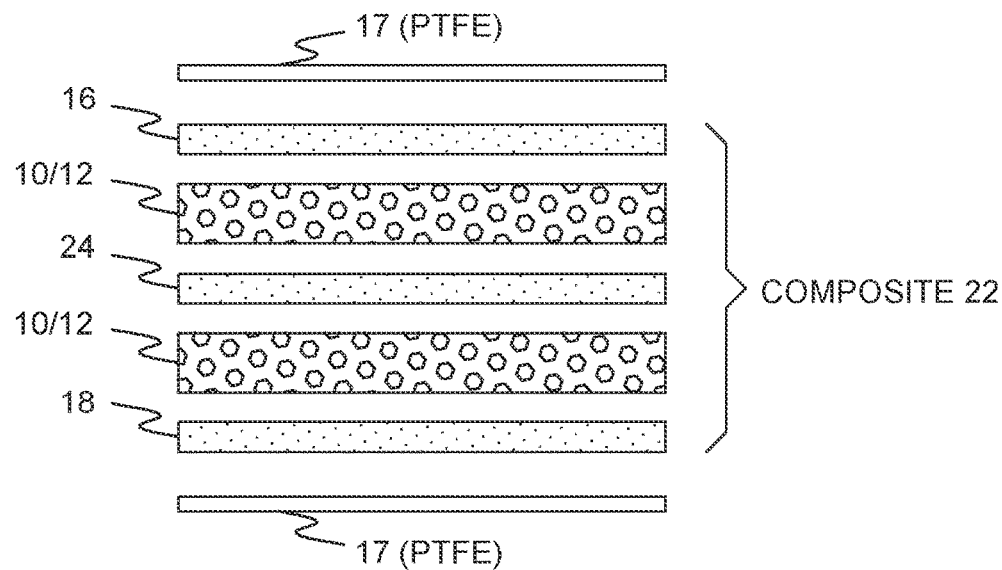

FIG. 2 illustrates another composite structure 22, in which a pair of partly or fully gel soaked foam carriers, typically polypropylene or polyurethane foam, are used with a sticky or tacky gel middle layer 24 of cured elastomeric polyurethane gel, along with a top 16 and bottom 18 layer. This additional gel may provide additional resiliency to the composition and help the foam layers to adhere to one another. A PTFE or other suitable film 17 may be provided on the outer surfaces of either of the gel layers 16/18.

Foam carriers 10/11/12/13 act to provide some dimensional stability, even though, in some embodiments, they may allow stretch, indeed up to over 500%. They also act as a base for the tacky polyurethane gel for absorption there into. PTFE film or other suitable material may be used on either the top or bottom of the gaskets as a moisture barrier and to provide a non-tacky, slick surface for engaging a workpiece or base.

Figure 2A:
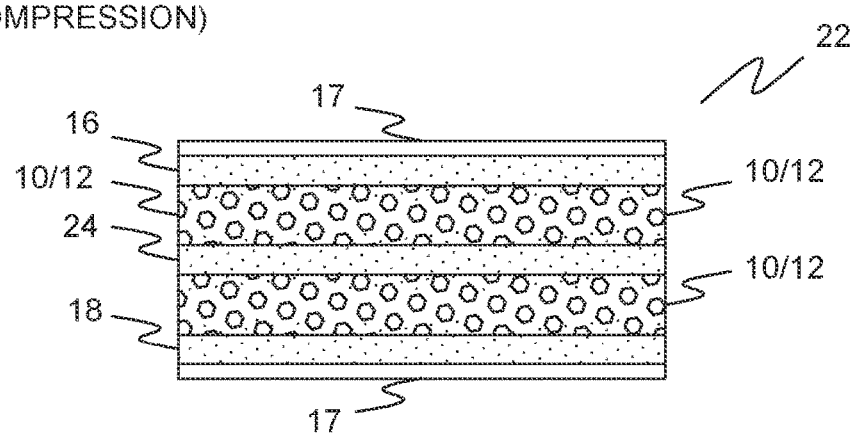

FIG. 2A represents composite structure 22 in a compressed state. such as between an aircraft base and an aircraft workpiece. As in FIG. 1A, it may be seen that the foam layers or carriers may at least partially absorb some of the polyurethane gel. The use of the foam carrier may provide some resiliency to the composite as well as some dimensional stability to the composite. The use of more than one foam, such as both an open cell and a closed cell carrier layer may provide additional resiliency.

Figure 3:
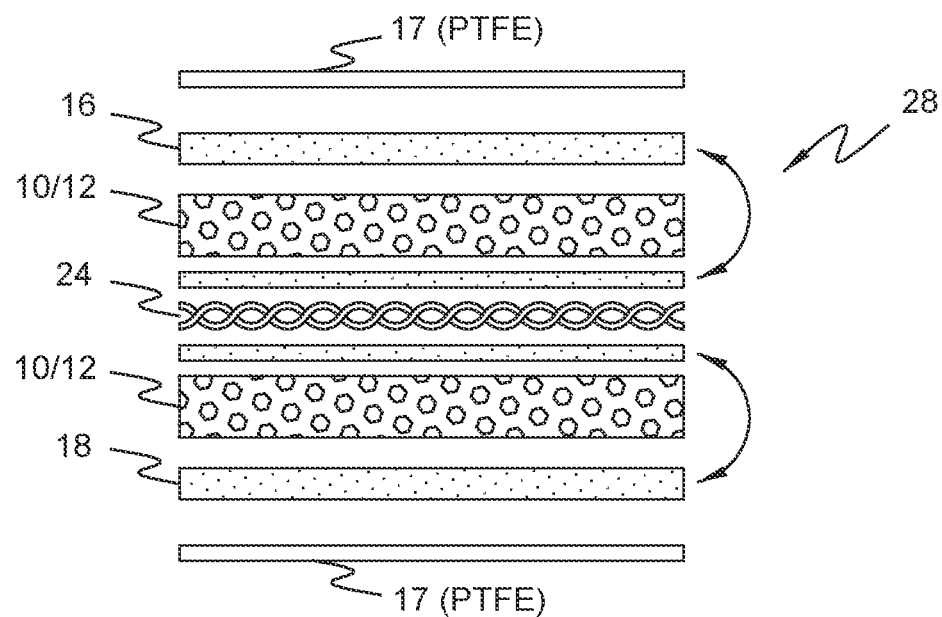

FIG. 3 illustrates a composite 28 that includes a skeletal member 24, which in one embodiment is woven, such as a metallic or non-metallic fabric. On both sides of the skeletal member 24, foam carriers 10/11/12/13 may be provided. A gel layer 16/18 may be interposed between the foam or on the outside of both foam members (see FIG. 3) or both. In one embodiment, two open cell foam layers "sandwich" polyurethane gel layers, with no polyurethane gel on the outside of surfaces of the two foam carriers. In another embodiment, polyurethane coats one or both of the outer surfaces of the foam carrieralso.

Figure 3A:
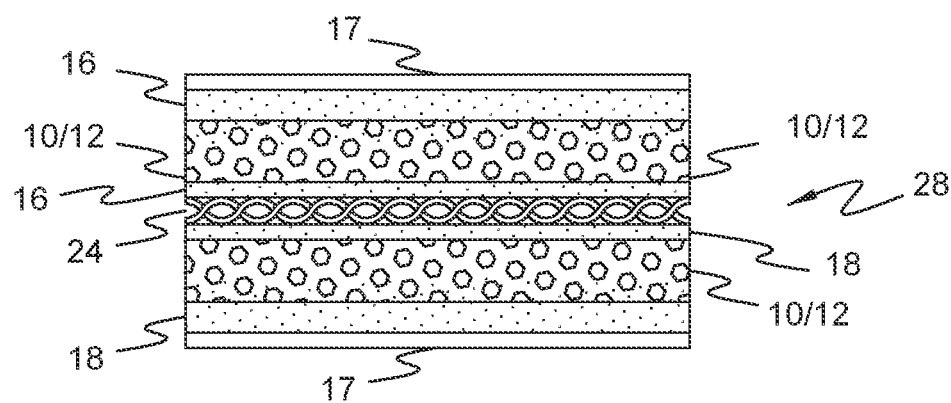

FIG. 3A shows composite 28 under compression wherein in the manufacturing or compression process an open cell polypropylene or other suitable foam has absorbed atleast some of the polyurethane gel and the polyurethane gel has worked through the weaves of a skeletal fabric, such that the entire composite 28 is saturated or substantially saturated with the gel.

A sticky, soft polyurethane gel may be the gel disclosed in U.S. Pat. Nos. 6,530,577; 6,695,320; and 7,229,516, which patents are incorporated herein by reference and US Publication 2004/0041356, which is incorporated herein by reference. The composite structures may be made according to the teachings set forth in US Publication Nos. 2004/0070156 and 2004/0041356, incorporated herein by reference.

Gaskets of the composite may be made as by die cutting as set forth in US Publication Nos. 2004/0070156 and 2004/0041356, and U.S. Pat. Nos. 6,530,577; 6,695,320; and 7,229,516. The foam may be; in one case, open or closed cell polypropylene foam, in the range of about 30 to 250 mil thick. The composite structures formed may have a pre-compression thickness in the range of about 30 to 500 mil, and a compressed thickness of about 10 to 450 mil when under about 50 to 500 psi.

The uses of the composite structures illustrated may be for aircraft gaskets or sealant tape. They may be used underneath the floorboards, underneath laboratories, in stringers, sealing access panels, on antennae and in galleys to help prevent against corrosion. Optional skin 17 is shown to be, in one embodiment, a PTFE sheet acting as a moisture barrier and providing substantial dimensional stability. It may be any suitable moisture proof sheet that sticks to the polyurethane and contacts the workpiece. It may be used on one side, both sides or it may be omitted entirely. Skeleton 24 may be metallic or non-metallic, may be fiberglass, may be woven or unwoven and, in one embodiment, with a weave density of approximately 20 to 80.

The polyurethane may be the polyurethane as described in the patents and publications incorporated herein by reference. It may be a two component cured polyurethane, which contains no silicon, and is used in a tape or gasket. Unlike pressure sensitive adhesive layers, polyurethane provides a tackiness and retentivity and provides both a good environmental seal as well as ease of removal and reuse.

One method of making an embodiment of a foam composite structure may be found in US Publication No. 2005/0109190 entitled Dampening Material For A Drum. This publication is incorporated herein by reference. While the reference discloses an open cell foam, a closed cell foam may be partially saturated with a pre-cured polyurethane mix as set forth in the published application and then allowed to cure. Closed cell foam may be used with the uncured mix, which will typically penetrate at least those cells of the closed cell foam that are open to the surface of the foam carrier. Moreover, when the closed cell foam is subject to compression as when a workpiece is tightened down to a base with a gasket having closed cell foam and gel coated structure therebetween, some of the cells of the foam may break and the gel, though cured, is deformable and flowable under compression and may be forced into such broken cells. Thus, even closed cell foam may have some penetration of the gel thereinto In an alternate embodiment of any of the composites, skin 17 is not PTFE, but is a woven fabric, metallic or non-metallic, with sufficient open pore space to allow some of the gel to seep through under compression, typically between about 100 and 500 psi. This results in a "semi-tacky" surface and easy removal of the one piece base, but still provides for a good environmental seal against the workpiece or a base due to its ability to allow the tacky gel to seep through the material and reach the surface of the workpiece and base and fill surface irregularities and the like.

Applicant's pre-cured polyurethane elastomer sealant with the polypropylene foam carrier may also be used in tape form for sealing and moisture proofing around mated electrical connectors, coaxial connectors, circumferential and irregular surfaces. While the open cell foam may be saturated or partly saturated, the closed cell foam may be coated with a polyurethane gel.

With a PTFE skin on one side, it can provide single sided sealing. With a semi-porous skin on one or either side, it can provide a semi-tacky gasket or tape sealant. One such fabric that will provide a semi-porous skin is a metallized woven fabric Zell-CR, from Shieldex Trading, Palmyra, NY.

Figure 4:
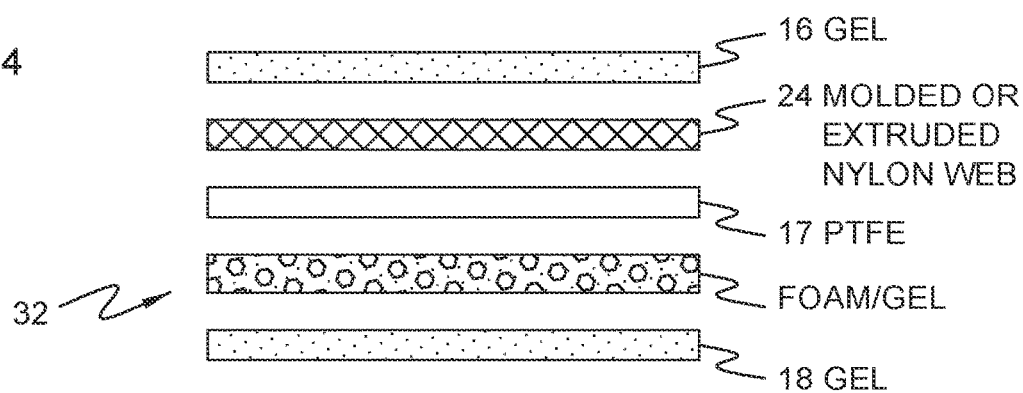
FIGS. 4 and 4A are views of another alternate embodiment of Applicant's invention.

FIGS. 4, 4A, 5, 5A, and 5B illustrate alternate preferred embodiments of Applicant's embodiments. FIG. 4 exploded and 4A under compression illustrate the use of a specific type of skeleton 24, more specifically, a molded or extruded nylon web or any of the other skeletons disclosed in U.S. patent Ser. No. 14/484,570, filed Sep. 12, 2014, incorporated herein by reference. While Applicant is illustrating in FIGS. 4, 4A, 5, 5A, and 5B, the use of the specific skeleton in the form of web 24, it is to be understood that any of the other embodiments of the invention set forth herein may have this skeleton, for example, the embodiments illustrated in FIGS. 3 and 3A. Indeed, the skeletons of any embodiment may be metallic, non-metallic, woven, non-woven, rigid metal foam, molded or extruded nylon or plastic, web or any other material that is comprised of a non-foam material that will provide some dimensional and structural integrity to the foam/gel and other elements of the composites while being capable of retaining, in voids or openings therein, a gel or other suitable matrix.

Figure 4A:
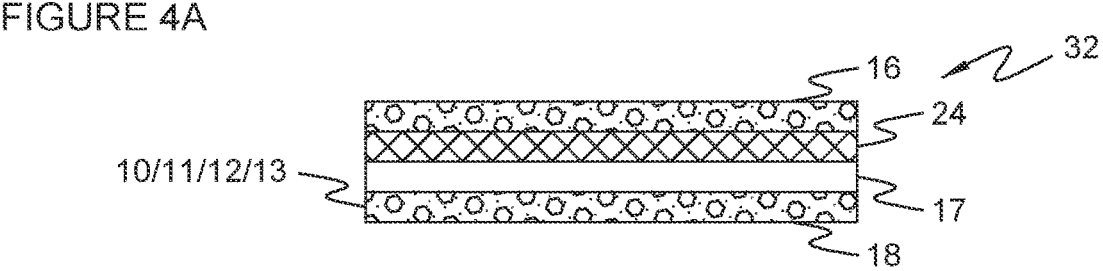

In FIGS. 4 and 4A, a tacky composite 32 is illustrated. The skeletal web typically, when the product is manufactured and in use, carries a thin layer of gel on the upper surface thereof, and gel therethrough in the voids of the skeleton 24 and, if a PTFE or skin-type sheet is used (as shown optional, without), then stickiness to the lower or bottom surface of the gasket may be provided by foam 10111/12/13, which may comprise a type foam, which may be partially or fully saturated with gel or other suitable tacky matrix. Typically, a thin, sticky lower layer of gel 18 is present on the finished product 32.

Figure 5:
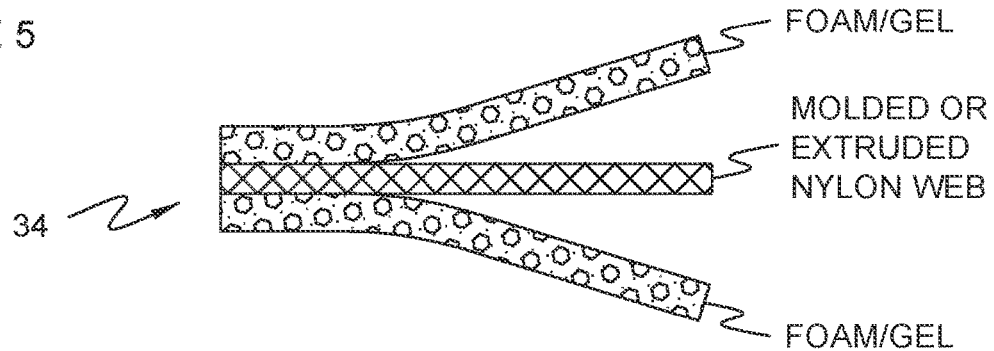
FIGS. 5, 5A, and 5B are views of another alternate embodiment of Applicant's invention.
Figure 5A:
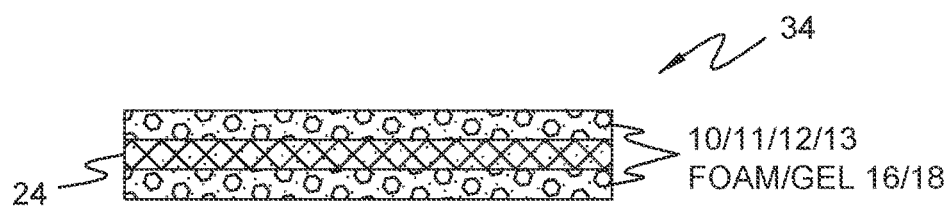

FIGS. 5 and 5A illustrate an alternate preferred embodiment 34, which comprises Applicant's novel molded or extruded nylon or plastic web 24 as seen in the '570 application, with afoam/gel on the top and the bottom thereof. Foam 10/11/12/13 may be opened, closed, reticulated or semi-opened, and may be partly or fully saturated with the gel to provide tackiness on either side of the composite 34.

As stated above, the foam may be any flexible, compressible foam of an opened, closed or semi-opened cell foam (see, for example, U.S. Pat. No. 8,561,310, incorporated herein by reference for a semi-opened nylon foam). Any of the composites disclosed may have a PTFE skin on the upper, lower or both surfaces or in between. Using the skin, of which PTFE is one example thereof, will present a substantially non-tacky surface to the workpiece. In some applications, it may be preferable for the composite to have a tacky side, with a tacky gel on the surface of a foam or on the surface of a skeleton, such as seen in FIG. 4, for exposure to and contact with the workpiece under compression to provide a good environmental seal.

Other types of foam are those disclosed in Application US 2013/0224434, which disclose using an open cell foam with pressure sensitive adhesives other than a gel for stickiness.

Applicant's gel may be a polyurea gel, polyurethane gel or other suitable two-part polymer gel. It may have a peel strength of about 0.3 and 1.0 lb./in. width, or about 0.1 and 2.0 lb./in. width. Gel soaked open cell foam with a PTFE liner (AVDEC HT-3000) and another with a 2 mil polyfilm (AVDEC AD-89513) yielded a range of 65-85 Shore "00" or 35 to 65 Shore "A". this range is appropriate for Applicant's composites, also a broader range 50-100 on Shore "00", 25-75 on Shore "A". The gel can be two-part mix chemically cured as seen, for example, in U.S. Pat. No. 7,229,516, incorporated herein by reference, or may be thermally or otherwise cured. The gel is typically impregnated into the foam in those composites which call for such partial/complete saturation, and the gel is uncured and the gel is allowed to cure in place.

In some embodiments, the gel may be infused with a carry and suspension conductive particles for providing some conductivity between workpieces, such as metal parts, providing compression to Applicant's composites. These particles may be graphene mixed in the gel or the resin and graphene mix as disclosed in U.S. Pat. No. 8,652,362, incorporated herein by reference, the metal pigments disclosed in US Publication No. 2013/0168612, incorporated herein by reference, the metal particles disclosed in the Parker-Hannifin U.S. Pat. No. 8,633,402, incorporated herein by reference, or any other suitable conductive or semi-conductive particle.

Both gaskets and tape are anticipated for the configurations of Applicant's composites disclosed herein. Some of these composites, that lack a skeleton or have a skeleton that is flexible may be suitable for a partially stretchable tape that may be used to wrap electrical conductors as found, for example, in U.S. Pat. No. 7,229,516, FIG. 1B, incorporated herein by reference. All composites can be with or without a skeletal member and with or without a moisture proof barrier.

Figure 5B:
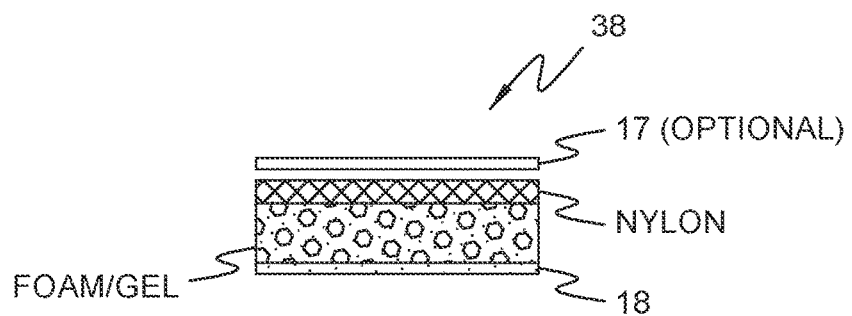
Figure 6:
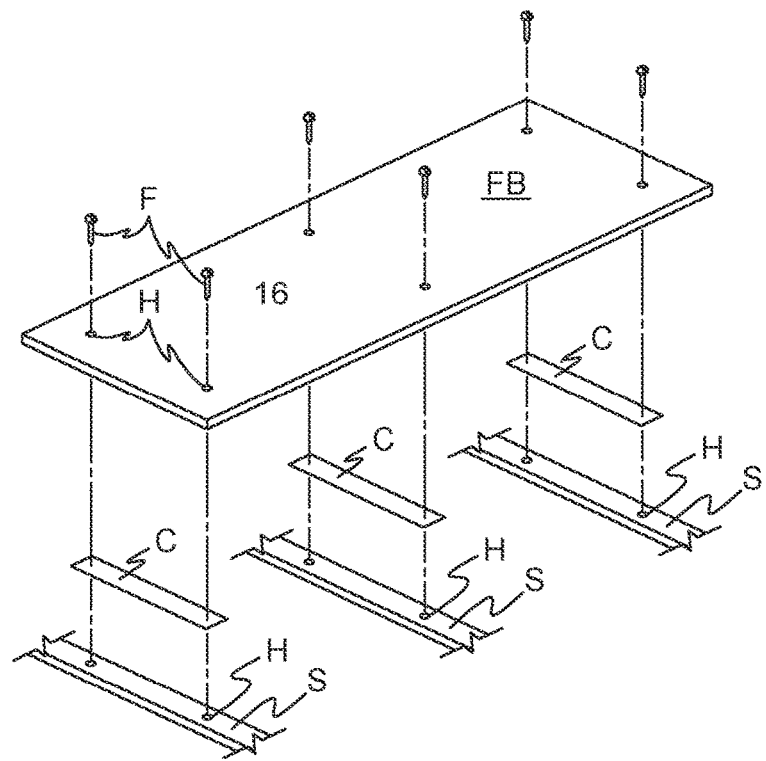
FIGS. 6 and 6A are views of a floorboard/stringer assembly that may use one or more embodiments of Applicant's tacky polyurethane composites

Another embodiment for Applicant's composite 38 (FIG. 5B) may be between floorboards FB of an aircraft and support stringers S or members (see FIG. 6). In this particular embodiment 38 (FIG. 5B), a "skinned" version of Applicant's tacky composite may be used with the tacky side on the aircraft structure and the impermeable or partially porous skin against the surface of the floorboard for ease of positioning the floorboard and ease of removability.

Figure 6A:
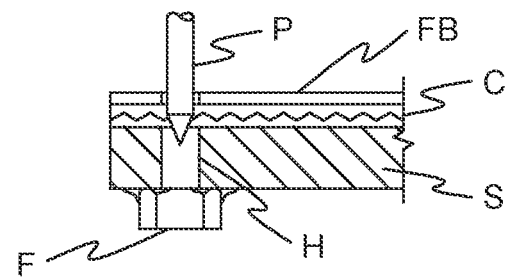
Figure 7:
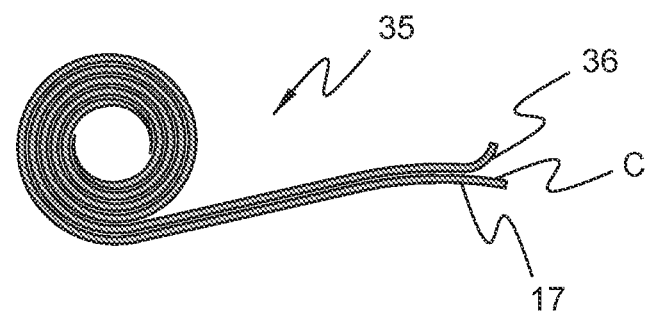
FIG. 7 is an elevational view of a composite in tape form.

FIGS. 6 and 6A illustrate the use of any of Applicant's composites herein designated "C" in a particular embodiment, namely, between the floorboards FB and stringers S of an aircraft. Typically stringers S have multiple holes H therein and floorboards FB are fastened down to the stringers S with a gasket or tape material therebetween to help avoid corrosion and the spread of moisture. In one embodiment, a tape 35 comprising a linear strip of composite C is provided, which tape 35 may include release film 36 on a surface thereof and may, in one embodiment be a composite C with a skin on an upper surface thereof. That is, composite C may be placed, sticky side down, onto stringers S and skin 17 on an upper side of the composite will allow easy movement of floorboard FB to align holes Hin the floorboards with holes Hin the stringers and the application of fasteners F therethrough. A piercing member P may be used after the floorboards are in place to pierce through composite C to allow fasteners F to pass therethrough following removal of piercing member P Ease of removability may be achieved by using a skeleton of a harder nature, for example, Applicant's molded or extruded nylon skeleton instead of woven fiberglass or a non-woven skeleton is more resistant to compression. Ease of removability may also be achieved by using a thicker skeleton, for example, a skeleton in the range of 18 to 28 mil, rather than, for example, in the range of 8 to 17 mil. The foam under compression may tend to impeded somewhat the lateral movement of gel with less edge squeeze out than cured gel.

Figure 8:
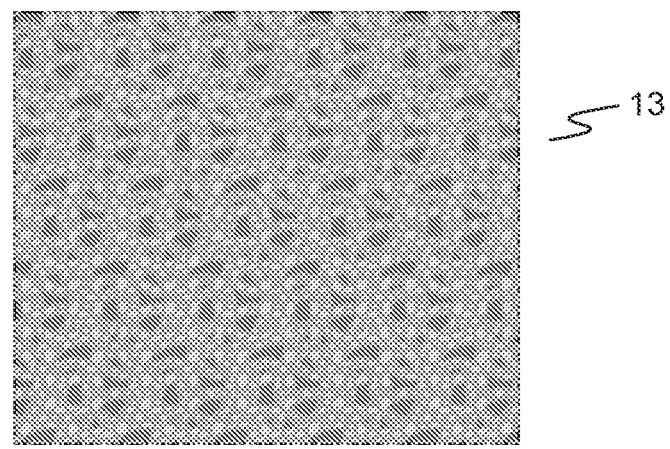
FIG. 8 is an illustration of a flexible reticulated foam.

FIG. 8 illustrates a reticulated flexible foam for use in any of Applicant's tacky composites. Reticulated foam is a very porous, low density solid foam. "Reticulated" means like a net. Reticulated foams are extremely open foams and few, if any, contain cell windows. A reticulated foam may be made of an organic binder, like polyurethane, and be flexible. They have a high porosity and a large surface area. Porosity may be over 90%, sometimes 95%, or as high as 98%. Reticulated foams are sometimes used in scrubbers or air conditioner filters. Any of Applicant's tacky embodiments may use reticulated foam carrier 13 and, in one case, a reticulated foam provided by Riley Foam Corporation as the SIF® filter foam for air filter applications. This is a polyester urethane foam with a three-dimensional structure of skeletal strands. Each cell in the foam is completely interconnected with all surrounding cells. It has a high tensile strength and tear resistance together with easy workability. This filter foam is produced in a number of pore sizes, expressed as the average number of pores per linear inch, and may run from about 5 to about 100 ppi. It can withstand intermittent temperatures as high as about 250° F. and has a void volume of about 97%. It is not adversely affected by water, detergents or else solvents or grease at normal operating temperatures. Tensile strength ranges between about 22 to about 35 psi, and elongation between about 275% to about 400%. Nominal pore size may be variable for a given thickness and, in one embodiment, may be between 40 and 110 and a porosity grade between 45 and 100.

FIGS. 5A and 5B illustrate embodiment 38 with a foam gel layer 10/11/12/13, which may be manufactured according to the AVDEC patents incorporated by reference. Also, a nylon web or skeleton 24 is placed adjacent a surface of the saturated foam gel before the material is compressed between two parts. The nylon web may be partially or fully saturated before placement adjacent the foam gel, before placement between the aircraft parts or the nylon web may be dry and compression when the aircraft parts are torqued down will force the gel from the foam gel to migrate into the open spaces of the nylon web and adjacent the face of the workpiece adjacent the nylon web, effectively coating it to provide environmental seal.

FIGS. 1, 2, 3, and 4 show gel layers separate from the foam for illustration, but it is to be understood that unless the foam is a closed cell foam, the open, semi-open or reticulated foam is saturated prior to use by the methods set forth in the AVDEC patents. When open cell foam is used, the gel may be layered separately, alternating with the closed cell foam in the methods described in the patents.

When non-closed cell foams are used in the manufacturing process as set forth in the patents that are incorporated by reference, it is to be understand that in all of the compositions, gel tends to migrate when the compositions are placed between workpieces which are then placed under compression, for example, by fasteners. The gel will tend to migrate between openings in any type of a skeletal member, openings in the open cells of the foam, including closed cell foam where the cells have been broken by virtue of compression, and typically vertical migration stopped only by impervious skin/barrier, such as PTFE 17. That is to say, the composites, excepting the skin, are typically encapsulated with gel, the gel providing a good environmental seal, the foam providing some resiliency and some (though usually not total) resistance to migration as well as some structural stability and the skeleton, if present, providing additional stability.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A gasket tape, the gasket tape comprising:
   a first foam layer and a second foam layer each with an outer and inner surface, the outer surface being sticky;
   a polytetrafluoroethylene (PTFE) layer;
   wherein the first and second foam layers lay to either side of the PTFE layer and the outer surface of the first foam layer and the outer surface of the second foam layer comprise a first and second outer surface of the gasket tape.

2. The gasket tape of claim 1 wherein at least one of the foam layers comprises a gel.

3. The gasket tape of claim 1 wherein at least one of the foam layers comprises a pressure sensitive adhesive.

4. The gasket tape of claim 1 wherein at least one of the foam layers comprises a cured polymer.

5. The gasket tape of claim 1 wherein the foam layers comprise closed cell foam.

6. The gasket tape of claim 1 wherein the inner surface of the first and second foam layers is in contact with the PTFE.

7. A gasket tape, the gasket tape comprising:
a first foam layer and a second foam layer each with an outer and inner surface, the outer surface being sticky;
a PTFE layer;
wherein the first and second foam layers lay to either side of the PTFE layer and the outer surface of the first foam layer and the outer surface of the second foam layer comprise a first and second outer surface of the gasket tape;
wherein at least one of the foam layers comprises a pressure sensitive adhesive; and,
a wherein at least one of the foam layers comprises a cured polymer.

8. The gasket tape of claim 7 wherein the first and second foam layers comprise closed cell foam.

9. The gasket tape of claim 8 wherein at least one of the foam layers comprises a cured polymer.

10. The gasket tape of claim 8 wherein at least one of the foam layers comprises a pressure sensitive adhesive.

11. A method of sealing between an aircraft floorboard and a stringer that supports the floorboard, the method comprising the steps of:
providing a gasket tape, the gasket tape comprising:
a first foam layer and a second foam layer with an outer and inner surface, the outer surface being sticky;
a PTFE layer;
wherein the first and second foam layers lay to either side of the PTFE layer and the outer surface of the first foam layer and the outer surface of the second foam layer comprise a first and second outer surface of the gasket tape;
placing the gasket tape between the stringer and floorboard; and
fastening the stringer to the floorboard.

12. The method of claim 11 wherein the gasket tape comprises a tape.

* * * * *